United States Patent [19]

O'Malley et al.

[11] Patent Number: 4,539,351
[45] Date of Patent: Sep. 3, 1985

[54] SILICONE RESIN COATING COMPOSITION WITH IMPROVED SHELF LIFE

[75] Inventors: William J. O'Malley, Killington, Vt.; Howard A. Vaughn, Jr., Schenectady, N.Y.

[73] Assignee: General Electric Company, Waterford, N.Y.

[21] Appl. No.: 692,858

[22] Filed: Jan. 17, 1985

Related U.S. Application Data

[63] Continuation of Ser. No. 343,345, Jan. 27, 1982, abandoned.

[51] Int. Cl.$^3$ ............ C08L 1/28; C08L 5/00; C08L 83/00
[52] U.S. Cl. ................. 524/43; 524/55; 524/588; 523/150; 106/287.12; 106/209; 106/193 J; 106/197.1; 428/447
[58] Field of Search ............ 523/150, 156; 524/43, 524/45, 55, 588; 106/287.12, 287.24, 287.34, 197 R, 209, 193 J; 428/447

[56] References Cited

U.S. PATENT DOCUMENTS

| | | | |
|---|---|---|---|
| 3,708,225 | 1/1973 | Misch et al. | 351/160 |
| 3,976,497 | 8/1976 | Clark | 106/287 SE |
| 3,986,997 | 10/1976 | Clark | 260/29.2 M |
| 4,027,073 | 5/1977 | Clark | 428/412 |
| 4,177,315 | 12/1979 | Ubersax | 428/336 |
| 4,188,451 | 2/1980 | Humphrey, Jr. | 428/331 |
| 4,277,287 | 7/1981 | Frye | 106/287.12 |
| 4,309,319 | 1/1982 | Vaughn, Jr. | 523/150 |

*Primary Examiner*—John Kight
*Assistant Examiner*—Nathan M. Nutter

[57] ABSTRACT

A silicone resin coating composition with improved shelf life is disclosed herein. A coating composition having a basic pH in the range of from 7.1–7.8 and prepared by hydrolyzing an alkyltrialkoxysilane or aryltrialkoxysilane in an aqueous colloidal silica dispersion is diluted to 10–15% solids. A compatible thickening agent is then added.

29 Claims, No Drawings

SILICONE RESIN COATING COMPOSITION WITH IMPROVED SHELF LIFE

This application is a continuation of application Ser. No. 343,345, filed Jan. 27, 1982, now abandoned.

BACKGROUND OF THE INVENTION

This invention relates to a protective coating composition. More particularly, it relates to a silicone resin coating composition with improved storage capacity which, when applied to a substrate, forms a protective, abrasion-resistant coating thereon.

Recently, the substitution of glass glazing with transparent materials which do not shatter, or are more resistant to shattering than glass, has become widespread. For example, transparent glazing made from synthetic organic polymers is now utilized in public transportation vehicles such as trains, buses, taxis and airplanes. Lenses in eye glasses and other optical instruments, as well as glazing for large buildings, also employ shatter-resistant, transparent plastics. The lighter weight of these plastics in comparison to glass is a further advantage, especially in the transportation industry where the weight of the vehicle is a factor in its fuel economy.

One of the most promising and widely used transparent plastics for glazing is polycarbonate, such as that known as Lexan ®, sold by General Electric Company. It is a tough material, having high impact strength, high heat deflection temperature and good dimensional stability. It is also self-extinguishing and is easily fabricated. Acrylics, such as polymethylmethacrylate, are also widely used transparent plastics for glazing.

Although these plastics provide the advantages of being more shatter-resistant and lighter than glass, they are easily marred and scratched by contact with abrasives such as dust, cleaning equipment and ordinary weathering. This has led to the development of coatings which serve to improve the abrasion resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225 (Misch et al.), 3,986,997 (Clark), 3,976,497 (Clark) and 4,177,315 (Ubersax), for example, describe such compositions.

In copending U.S. application Ser. No. 964,910, now abandoned, coating compositions having improved resistance to moisture and humidity and ultraviolet light are disclosed. It was discovered therein that, in direct contrast to the teachings of U.S. Pat. No. 3,986,997, compositions having a basic pH, i.e., 7.1-7.8, do not immediately gel but in fact provide excellent abrasion-resistant coatings on solid substrates.

Silicone resin coatings such as those disclosed in U.S. Pat. No. 4,309,319, incorporated herein by reference, have shown great promise in protecting transparent plastics. However, a serious drawback diminishing their usefulness is that silicone resin hard coatings are short-lived when stored at room temperature. Refrigerated storage and shipping are required to obtain extended shelf life beyond the usual one-month life at room temperature.

SUMMARY OF THE INVENTION

Accordingly, it is the object of this invention to provide a silicone resin coating composition with improved storage stability at room temperature.

This is accomplished herein by preparing a coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition having a pH of from 7.1 to 7.8 and containing 10 to 50 weight percent solids, said solids consisting essentially of 10 to 70 weight percent colloidal silica and 30 to 90 weight percent of the partial condensate; diluting said composition to 10–15% solids; and adding a thickening agent.

DETAILED DESCRIPTION OF THE INVENTION

The improved coating compositions of this invention are prepared by hydrolyzing a trialkoxysilane or a mixture of trialkoxysilanes of the formula $R'Si(OR)_3$, wherein R' is alkyl of from 1 to 3 carbons or aryl, such as phenyl, and R is alkyl, in an aqueous dispersion of colloidal silica.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox ® (duPont) and Nalcoag ® (NALCO Chemical Co.). Such colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silicas having an alkali content of less than 0.35% (calculated as $Na_2O$) have been found to be preferable. Moreover, colloidal silicas having average particle size of from 10 to 30 millimicrons are also preferred. A particularly preferred aqueous colloidal silica dispersion for the purposes herein is known as Ludox LS ®, sold by duPont Company.

In accordance with this invention, the aqueous colloidal silica dispersion is added to a solution of a small amount of alkyltriacetoxylsilane in alkyltrialkoxysilane or aryltrialkoxysilane. For the purposes herein, from about 0.07 parts by weight, to about 0.1 parts by weight, based on 100 parts by weight of the total composition of the alkyltriacetoxysilane is used. The temperature of the reaction mixture is maintained at about 20° C. to about 40° C., preferably 20° C. to about 30° C., and most preferably below 25° C. It has been found that in about six to eight hours sufficient trialkoxysilane has hydrolyzed so as to reduce the initial two phase liquid mixture to one liquid phase in which the now treated silica (i.e., treated by its admixture with the alkyltrialkoxysilane or aryltrialkoxysilane) is dispersed. In general, the hydrolysis reaction is allowed to continue for a total of about 12 to 48 hours, depending upon the desired viscosity of the final product. The more time the hydrolysis reaction is permitted to continue, the higher will be the viscosity of the product.

After the hydrolysis has been completed to the desired extent, the solids content is reduced by the addition of alcohol or an alcohol mixture, preferably a mixture of isopropanol and isobutanol, to the reaction mixture. With resin compositions of this invention which contain thickener, the presence of isopropanol in the alcohol mixture has been found to provide better optical clarity. So long as the thickener is completely soluble in the alcohol or alcohol mixture, optical clarity in the finished coating should be obtainable. Other alcohols which are suitable dilution solvents include aliphatic alcohols, such as methanol, ethanol, propanol, n-butyl alcohol, isobutanol and t-butyl alcohol. Mixtures of such alcohols are suitable as well. The specific alcohol or alcohol mixture is not critical unless the thickener is not completely soluble therein. The solvent system should contain from about 20 to 75 weight percent alcohol to also ensure solubility of the partial condensate (siloxanol). Optionally, additional water-miscible polar solvents, such as acetone, butyl cellosolve and the like, in minor amounts (i.e., no more than 20% of the cosolvent system) can also be used. The solids content of the coating compositions of this invention is diluted to a range of from about 10% to 15% by weight of the total composition, which effectively prolongs the shelf life of the composition.

After dilution of the silicone resin composition, a small amount of a thickening agent, usually dispersed in a solvent, preferably aqueous isopropanol, is added to sufficiently increase the viscosity to yield a cured coating thick enough to have good solvent and abrasion resistance. Suprisingly, increasing the viscosity in this way does not shorten the shelf life of the composition as was found to occur when viscosity was increased by raising the solids content of the composition.

There are many thickening agents suitable for the purposes herein, including hydroxypropyl guar gum, hydroxypropyl cellulose, and the like. Amounts contemplated are about 50 to about 1,000 ppm by weight, preferably about 75 to about 750 ppm by weight, of the total composition.

The pH of the resultant coating compositions of the invention is in the range of from about 7.1 to about 7.8, preferably higher than 7.2, such as from 7.3 to about 7.5. If necessary, dilute base, such as ammonium hydroxide, or weak acid, such as acetic acid, can be added to the composition to adjust the final pH to this desired range. At these basic pH's and low solids contents, the compositions are translucent liquids which are stable at room temperature for at least five months. When stored at temperatures below about 5° C. (40° F.), the period of stability is increased even further.

The alkyltriacetoxysilane is used to buffer the basicity of the initial two liquid phase reaction mixtures and thereby also temper the hydrolysis rate. While the use of glacial acetic acid is preferred herein, alkyltriacetoxysilane may be used in its place, as well as other acids such as organic acids like propionic, butyric, citric, benzoic, formic, oxalic and the like. Alkyltriacetoxysilanes wherein the alkyl group contains from 1 to 6 carbon atoms can be used, alkyl groups having from 1 to 3 carbon atoms being preferred. Methyltriacetoxysilane is the most preferred alkyltriacetoxysilane.

The silanetriols, RSi(OH)$_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least, a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

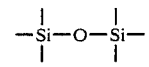

bonding occurs. This condensation place over a period of time and is not an exhaustive condensation but rather the siloxane retains an appreciable quantity of silicon-bonded hydroxyl groups which render the polymer soluble in the alcohol-water co-solvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate or siloxanol is obtained from the condensation of CH$_3$Si(OH)$_3$ and, depending upon the input of ingredients to the hydrolysis reaction, minor portions of partial condensate can be obtained, for example, from the condensation of CH$_3$Si(OH)$_3$ with C$_2$H$_5$Si(OH)$_3$ or C$_3$H$_7$Si(OH)$_3$; CH$_3$Si(OH)$_3$ with C$_6$H$_5$Si(OH)$_3$, or even mixtures of the foregoing. For optimum results in the cured coating, it is preferred to use all methyltrimethoxysilane (thus generating all monomethylsilanetriol) in preparing the coating compositions herein. In the preferred coating compositions herein, the partial condensate is present in an amount of from about 55 to 75 weight percent of the total solids in a co-solvent of alcohol and water, the alcohol comprising from about 50 to 95 weight percent of the co-solvent. Compositions prepared according to this invention will show no reduction in abrasion resistance, and no increase in viscosity, after 5 months of storage at room temperature.

At the low solids contents contemplated herein, it has been found that the polysiloxane polyether copolymers disclosed in U.S. Pat. No. 4,277,287, incorporated herein by reference, may be employed in the thickened compositions of this invention as flow control additives which assist in the prevention of flowmarks, dirtmarks and the like on the surface of the substrate which is coated. Generally, these polysiloxane polyether copolymers may be employed in amounts of from about 2.5 to about 15 weight percent of the total solids of the composition.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base, and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°–150° C. to provide a transparent abrasion-resistant surface coating.

The coating compositions of the present invention can be applied to a variety of solid substrates by conventional methods, such as flowing, spraying or dipping, to form a continuous surface film. Substrates which are especially contemplated herein are transparent, as well as non-transparent, plastics and metals. More particularly, these plastics are synthetic organic polymeric substrates such as acrylic polymers like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride butyrates, polyethylene and the like. The coating compositions of this invention are especially useful as coatings for polycarbonates, such as those polycarbonates known as Lexan ®, sold by General Electric Company and as coatings for injection molded or extruded acrylics, such as polymethylmethacrylates. Metal substrates on which the present protective coatings are also effective include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsequioxane ($RSiO_{3/2}$). In the finished cured coating, the ratio of $RSiO_{3/2}$ units to $SiO_2$ will range from about 0.43 to about 9.0, preferably 1 to 3. A cured coating having a ratio of $RSiO_{3/2}$ to $SiO_2$, where R is methyl, of 2 is most preferred. Coating thicknesses may vary but for the improved abrasion resistance desired herein, coating thicknesses of 0.5–20 microns, preferably 2–10 microns, are utilized.

In order that those skilled in the art may better understand how to practice the present invention, the following examples are given by way of illustration and not by way of limitation.

EXAMPLES 1–5

80.1 lbs. of Ludox LS (aqueous colloidal silica dispersion, average particle size of 12 millimicrons, pH of 8.2 sold by duPont) is added, over a period of one-half hour, to a solution of 88 g. of glacial acetic acid in 97.6 lbs. of methyltrimethoxysilane. The temperature of the reaction mixture is maintained between 20° C. and 30° C. The hydrolysis is allowed to proceed over a period of sixteen hours. 2.9 lbs. of a silicone polyether flow control agent (General Electric Company SF-1066) was added to the reaction mixture. Sufficient isobutanol was then added to reduce the solids content of the resin solution to 20% by weight.

Five test samples were then prepared as follows:

|  | SAMPLE | | | | |
| --- | --- | --- | --- | --- | --- |
|  | 1 | 2 | 3 | 4 | 5 |
| resin solution (lbs.) | 650 | 495 | 495 | 485 | 300 |
| isobutanol (lbs.) | — | 165 | 160 | 148 | — |
| isopropanol (lbs.) | — | — | — | — | 255 |
| thickening agent (lbs.) (1% hydroxypropyl cellulose in aqueous isopropanol) | — | — | 5 | 15 | 45 |
| solids content | 20% | 15% | 15% | 15% | 10% |

Important coating properties of the samples were then tested after intervals of approximately one and five months storage, yielding the following data:

| Sample | VISCOSITY (centistokes) | | |
| --- | --- | --- | --- |
|  | First Test | 1 Month | 5 Months |
| 1 | 5.2 | 6.3 | 10.4 |
| 2 | 4.6 | 5.0 | 5.6 |
| 3 | 4.8 | 5.2 | 5.7 |
| 4 | 5.7 | 6.2 | 6.8 |
| 5 | 7.4 | 7.5 | 7.6 |

For testing, sample compositions were coated and cured on primed Lexan ® plaques. Coating appearance was observed; and abrasion resistance was measured on a Taber Abraser, which involves the measurement of the increase in the amount of haze ($\Delta \% H_{500}$) after abrading 500 cycles using CS-10F abrasive wheels under a 500 gram load. The following results were observed:

| Sample | First Test | 1 Month | 5 Months |
| --- | --- | --- | --- |
|  | Coating Appearance | | |
| 1 | good | good | cracked |
| 2 | good | good | cracked |
| 3 | good | good | cracked |
| 4 | good | good | cracked |
| 5 | good | good | no cracks |
|  | $\Delta \% H_{500}$ | | |
| 1 | 0.5 | 3.7 | 3.1 |
| 2 | 1.9 | 9.7 | 3.2 |
| 3 | 1.1 | 16.7 | 2.5 |
| 4 | 2.8 | 15.8 | 3.9 |
| 5 | 5.3 | 18.6 | 1.8 |

From the above data it can be seen that the coating properties of samples prepared according to the present invention (Samples 3, 4, 5) changed less after prolonged storage than the control samples (Samples 1, 2). Although Sample 5 exhibited a slight initial haze, it gave the overall best performance. The initial haze may be eliminated by increasing the isopropanol content of the alcohol mixture.

Obviously, other modifications and variations of the present invention are possible in the light of the above teachings. For example, additives and other modifying agents, such as pigments, dyes and the like, may be added to the compositions of this invention. It is to be understood, however, that the changes may be made in the particular embodiments described above which are within the full intended scope of the invention as defined in the appended claims.

We claim:

1. An aqueous coating composition having improved room temperature shelf life comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition adjusted to 10 to 15 weight percent solids consisting essentially of 10 to 70 weight percent colloidal silica and 30 to 90 weight percent of the partial condensate by dilution with an aliphatic alcohol or mixture of alcohols, said composition further containing from about 75 to about 750 ppm by weight of a thickening agent, said composition having a pH of 7.1 to about 7.8.

2. A coating composition as defined in claim 1 wherein said thickening agent is selected from the group consisting of hydroxypropyl cellulose and hydroxypropyl guar gum.

3. A coating composition as defined in claim 1 wherein the aliphatic alcohol is a mixture of methanol and isopropanol.

4. A coating composition as defined in claim 3 wherein the alcohol mixture additionally contains isobutanol.

5. A coating composition as defined in claim 1 wherein said partial condensate is of $CH_3Si(OH)_3$.

6. A coating composition as defined in claim 1 containing from about 0.05 to about 0.5 weight percent of a buffered latent silanol condensation catalyst.

7. A coating composition as defined in claim 5 wherein said catalyst is sodium acetate.

8. A coating composition as defined in claim 5 wherein said catalyst is tetramethylammonium acetate.

9. A coating composition as defined in claim 1 wherein the pH is 7.2 to about 7.8.

10. A coating composition as defined in claim 1 wherein the composition contains from about 10 to about 15 weight percent solids consisting essentially of 25 to 45 weight percent colloidal silica and 55 to 75 weight percent of the partial condensate.

11. A coating composition as defined in claim 9 wherein the partial condensate is of $CH_3Si(OH)_3$.

12. A coating composition as defined in claim 1 wherein the composition contains about 10 weight percent solids, the partial condensate is of $CH_3Si(OH)_3$, the aliphatic alcohol is a mixture of methanol and isopropanol and said thickening agent is selected from the group consisting of hydroxypropyl cellulose and hydroxypropyl guar gum.

13. An aqueous coating composition having improved room temperature shelf life prepared by admixing an aqueous colloidal silica dispersion with a solution of an alkyltriacetoxysilane in an alkyltrialkoxysilane, maintaining the temperature of the admixture at from about 20° C. to about 30° C. for a sufficient time to reduce the reaction mixture to one liquid phase, maintaining the pH of the composition in the range of from about 7.1 to about 7.8, adjusting the solids content of the reaction mixture to about 10 to 15 weight percent by the addition of an aliphatic alcohol thereto, and thereafter adding from about 75 to about 750 ppm by weight of a thickening agent to the admixture.

14. An aqueous coating composition as defined in claim 13 wherein said alkyltrialkoxysilane is methyltrimethoxysilane, said alkyl(triacetoxy)silane is methyl(triacetoxy)silane and said aliphatic alcohol is isopropanol.

15. An aqueous coating composition as defined in claim 13 wherein said aqueous colloidal silica dispersion has a basic pH, an average particle size of about 12 millimicrons and an alkali content of about 0.10%.

16. A solid substrate having at least one surface coated with the aqueous coating composition of claim 1.

17. An article as defined in claim 15 wherein the solid substrate is comprised of a synthetic organic polymer.

18. An article as defined in claim 16 wherein said polymer is a transparent polymer.

19. An article as defined in claim 17 wherein said polymer is a polycarbonate.

20. An article as defined in claim 18 wherein said polycarbonate is transparent.

21. An article as defined in claim 18 wherein said polycarbonate is a poly(bisphenol-A carbonate).

22. An article as defined in claim 16 wherein said polymer is a polymethylmethacrylate.

23. An article as defined in claim 21 wherein said polymethylmethacrylate is transparent.

24. An article as defined in claim 15 wherein the aqueous coating composition has been cured on said surface of said solid substrate.

25. An article as defined in claim 15 wherein said surface of said solid substrate has been primed with a primer composition prior to having been coated with the aqueous coating composition of claim 1.

26. An article as defined in claim 24 wherein said primer composition is comprised of a thermosetting acrylic emulsion.

27. An article as defined in claim 24 wherein said primer composition is comprised of a thermoplastic acrylic composition.

28. An article as defined in claim 24 wherein said primer composition is comprised of an ethanol-isobutanol solution containing 1.5 weight percent of gamma-aminopropyltriethoxysilane and 1.5 weight percent of a preformed reaction product of gamma-aminopropyltriethoxysilane and maleic anhydride.

29. An aqueous coating composition having improved room temperature shelf life prepared by admixing an aqueous colloidal silica dispersion with a solution of acetic acid in an alkyltrialkoxysilane, maintaining the temperature of the admixture at from about 20° C. to about 30° C. for a sufficient time to reduce the reaction mixture to one liquid phase, maintaining the pH of the composition in the range of from about 7.1 to about 7.8, adjusting the solids content of the reaction mixture to about 10 to 15 weight percent by the addition of an aliphatic alcohol thereto, and thereafter adding from about 75 to about 750 ppm by weight of a thickening agent to the admixture.

* * * * *